PLATED PACKAGING FOR ELECTRONIC COMPONENTS

Filed Sept. 25, 1964 2 Sheets-Sheet 1

INVENTORS.
SALVATORE J. COMADO
LAWRENCE R. SPARROW
JERRY BRAIMAN
BY Robert [signature]
ATTORNEY INVENTORS.
SALVATORE J. COMADO
LAWRENCE R. SPARROW
JERRY BRAIMAN
BY Robert Levine
ATTORNEY United States Patent Office
3,316,463
Patented Apr. 25, 1967

3,316,463
PLATED PACKAGING FOR ELECTRONIC COMPONENTS

Salvatore J. Comado, Lawrence R. Sparrow, and Jerry Braiman, Indianapolis, Ind., assignors to P. R. Mallory & Co., Inc., Indianapolis, Ind., a corporation of Delaware Filed Sept. 25, 1964, Ser. No. 399,159
14 Claims. (Cl. 317—230)

ABSTRACT OF THE DISCLOSURE

This invention provides an hermetic seal for electronic components wherein the terminals are supported in glass-to-metal seals and the component enclosed in a surface metal layer.

The present invention relates to electrolytic devices and more particularly relates to means for providing hermetic seals for solid tantalum capacitors by a plating operation.

Hermetic seals for solid tantalum capacitors are usually obtained by applying a metal cathodic coating to a tantalum anode, placing the anode into a metal can which has a pellet of solder therein, heating the can to produce mechanical and electrical contact between the can and the cathode material on the anode, and finally soldering a glass-to-metal seal to the open end of the can. The major disadvantage of the present method is that it necessitates a numebr of handling operations of a product which should receive a minimum amount of handling. The more handling operations necessary, the greater the damage to the capacitor and the higher the number of scraped units.

Therefore, it is an object of the present invention, to provide a unique, hermetically sealed solid tantalum capacitor.

It is an object of the present invention to provide a hermetically sealed solid tantalum capacitor which is considerably smaller in volume than the conventional hermetically sealed solid tantalum capacitor.

It is an object of the present invention to provide a means for hermetically sealing solid tantalum capacitors which dispenses with metal can and solder connections, thus reducing the number of handling operations during production.

It is an object of the present invention to provide both the cathode, the packaging means and the securing means for the hermetic seal by means of a plating operation.

The present invention in another of its aspects, relates to the novel features of the instrumentalities of the present invention described therein for teaching the principal object of the present invention and to the novel principles employed in the instrumentalities whether or not these features and principles may be used in the said object or in the said field.

With the aforementioned objects enumerated, other objects will be apparent to those possessing ordinary skill in the art. Other objects will appear in the following description, appended claims and appended drawings. The invention resides in the novel construction, combination, arrangement, and cooperation of the elements as hereinafter described and more particularly as defined in the appended claims.

For a fuller understanding of the nature and objects of the invention, reference has been made to the following detailed description, taken in conjunction with the accompanying drawings in which.

Generally speaking, the present invention provides a hermetic seal for electrolytic devices such as solid tantalum capacitors, by means of a plating operation. The plating operation applies the cathode material and the capacitor packaging while plating the glass-to-metal seal to the unit, thereby producing a hermetically sealed, solid tantalum capacitor.

Figure 1:
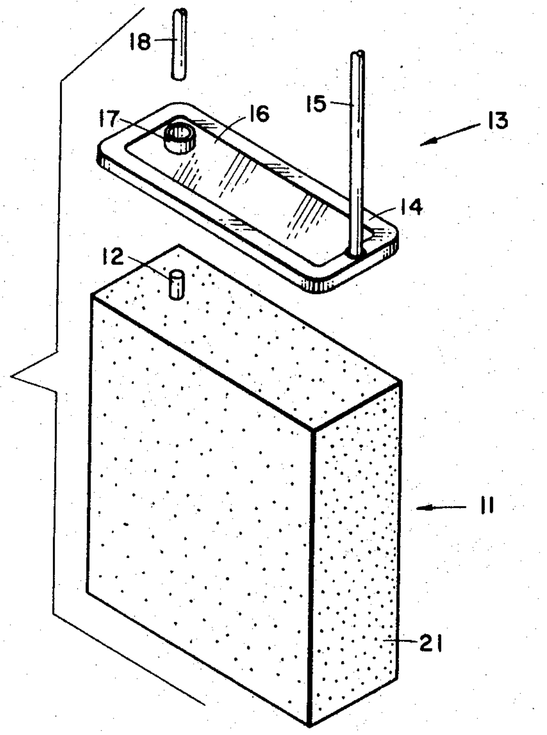
FIGURE 1 is an exploded view of one embodiment of the anode and seal of the present invention prior to plating.

FIGURE 1 is an exploded view of one embodiment of the present invention showing the parts to be assembled. A capacitor body comprising a solid tantalum anode 11 having a dielectric film and an $MnO_2$ electrolyte layer thereon (not shown) is coated with graphite 21. Anode 11 has anode riser 12 extending therefrom. The glass-metal seal unit 13 which comprises a metal ring 14 having a cathode lead 15 attached thereto, a glass insulating portion 16 and a metal opening 17 for anode lead 12. Anode lead 18 is affixed to anode riser 12 and seal unit 13 is placed on anode 11. The unit is inverted and placed on a positioning means in a plating chamber so that the unit rests on seal 13, the top portion of which is isolated from the plating material. The capacitor body is heated to 180°–200° C. and a gaseous stream comprising a carrier gas and a minimum of 4% nickel carbonyl vapor is passed through the chamber until a 3–5 mil nickel coating is obtained. The unit is so positioned in the chamber so that seal unit 13 is plated to anode 11 while the cathodic layer is plated thereon.

Figure 2:
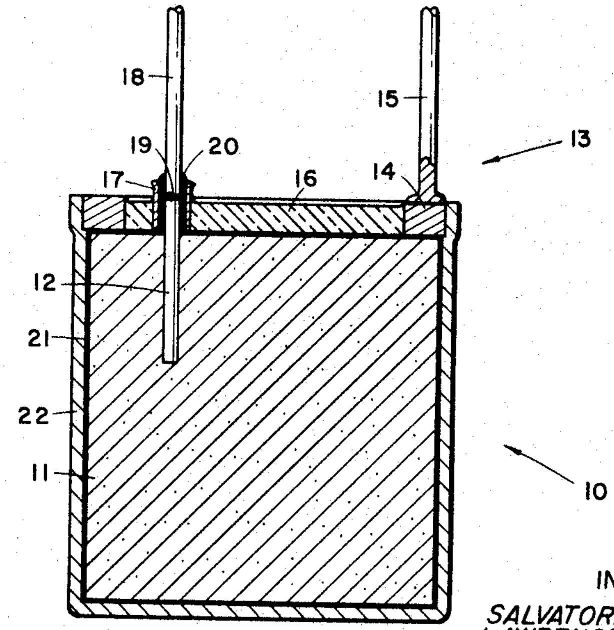
FIGURE 2 is a sectional view of the completed hermetically sealed capacitor.

FIGURE 2 is a sectional view of the completed capacitor 10. Anode 11 having graphite coating 21 has a metal cathode coating 22 plated thereon. Coating 22 also serves as the final packaging means as it affords good mechanical protection and is impervious to moisture. The plated cathode material 22 extends over ring 14 of seal unit 13 thereby affixing said seal during the plating process. Opening 20 is soldered after the plating process to insure a seal around the anode lead 18 as can be seen in FIGURE 2.

Figures 3, 4:
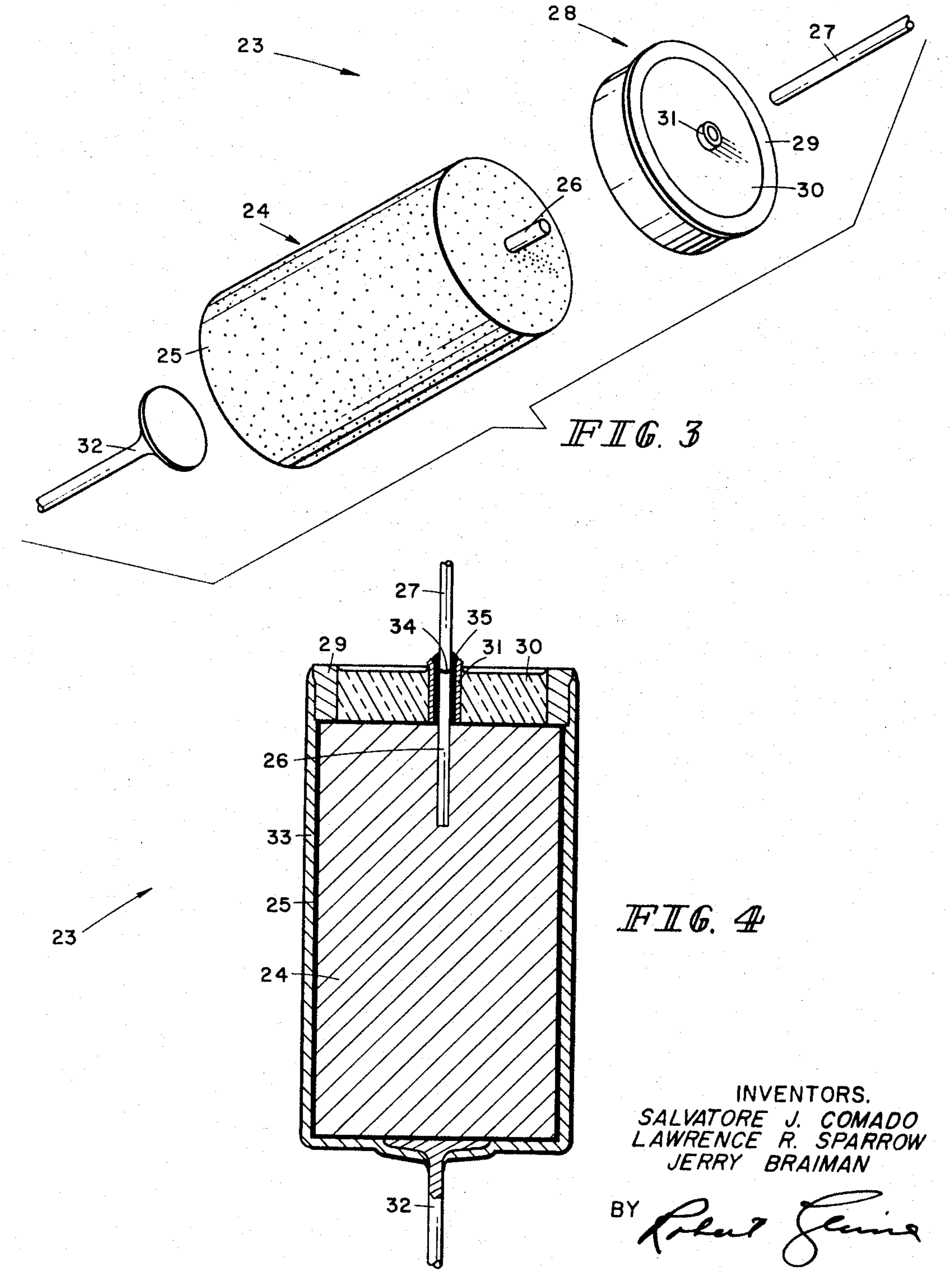
FIGURE 3 is an exploded view of an axial lead capacitor prior to plating.
FIGURE 4 is a sectional view of the completed hermetically sealed axial lead capacitor.

FIGURE 3 is an exploded view of an axial lead capacitor 23 comprising a solid tantalum anode 24 having a graphite coating 25 thereon and an anode riser 26 extending therefrom. Anode lead 27 is welded to anode riser 26 and seal unit 28 positioned over riser 26. Seal unit 28 comprises an outer metal ring 29, a glass insulating disk 30 and an inner metal ring 31. Capacitor 23 is positioned in a plating chamber so that it rests on seal unit 28. Cathode lead 32 is positioned on the opposite end of anode 24 and may be attached with a material such as silver epoxy or by the plating process.

In FIGURE 4, capacitor 23 is shown after the plating operation. Seal 28 comprising metal ring 29, a glass insulating disk 30 and an inner metal ring 31 has been plated in place by coating 33. Coating 33 is applied over graphite layer 25 which serves as a protective medium for the oxide layers (not shown) on anode 24. Cathode lead 32 has also been plated in place by coating 33. Aperture 35 between ring 31 and the anode riser 26—anode lead 27 portion is sealed by solder. It can be seen that weld 34 between anode riser 26 and anode lead 27 is protected. Coating 33 serves as both the cathode material and the final packaging and enables units to be produced which are much smaller in volume than are the conventionally packaged, hermetically sealed, solid tantalum capacitors.

The present invention provides a means for hermetically sealing solid tantalum capacitors which replaces conventional applications of cathode material to the anode and eliminates the cathode can and solder pellet, and the heating operation to mechanically and electrically connect the cathode material to the can. The plated cathode material, which also serves as the container, secures the glass-to-metal seal to the anode, and produces a unit considerably less in volume than the conventional hermetically sealed solid tantalum capacitor.

Although the plating process as hereinbefore described specifies an organo-nickel compound, any metallic compound capable of vaporization, decomposition and deposition at temperatures which will not harm the substrate and which will provide a moisture impervious coating of sufficient mechanical strength may be used. Such compounds include nickel tetracarbonyl, iron pentacarbonyl, and any other suitable organo-metallic compound.

Furthermore, the present invention is not limited to vapor-phase deposited coatings. Any conventional plating method which provides a moisture impervious coating of sufficient mechanical strength and which does not damage the capacitor may be used. Such methods include vacuum plating, electroplating, electroless plating, and the like.

The present invention is also applicable to capacitors wherein a cathodic material such as conductive plastics, sprayed and dipped metals and the like are applied to the anode by conventional means. Coatings are then deposited on the conductive plastic or metal substrates for obtaining hermetic seals. In this case, the coating serves as the container and as a sealing means. This is particularly applicable to situations wherein it is desirable to retain conventional cathodic material but produce a unit of smaller volume than can be obtained by the conventional method.

Electrical devices which require moisture vapor impermeability and mechanically durable packaging, but which cannot withstand plating conditions or which will be damaged by a direct application of a deposited metallic coating may be precoated with a protective material such as plastics or other materials which can withstand plating conditions and which serve to protect the device during plating. Such devices include capacitors, resistors and the like.

It will be understood that this invention is susceptible to modification in order to adapt it to different usages and conditions. Such modifications in the specific embodiments above will be readily apparent to those skilled in the art. We consider all of these variations and modifications to be within the foregoing description and defined by the appended claims.

Having thus described our invention, we claim:

1. An hermetically sealed electrical device comprising a first electrode having a terminal riser, a dielectric film intimately covering the surface of said electrode and a semiconductor layer overlying the dielectric layer, a seal cap comprising a glass body disposed on the semiconductor layer, said body having first and second terminals spaced from each other and joined to the body in glass-to-metal seals, said first terminal being connected to said riser in an hermetically sealed joint, said second terminal surrounding the glass body, and an hermetically impervious metal layer, disposed on the semiconductive layer, forming a second electrode of and encasing the device, and said metal layer having a margin embracing the second terminal in an hermetically sealed joint.

2. An hermetically sealed electrical device comprising a first electrode having a terminal riser, a dielectric film intimately covering the surface of said electrode and a semiconductor layer overlying the dielectric layer, a graphite layer overlying the semiconductor layer, a seal cap comprising a glass body disposed on the semiconductor layer, said body having first and second terminals spaced from each other and joined to the body in glass-to-metal seals, said first terminal being connected to said riser in an hermetically sealed joint, said second terminal surrounding the glass body, and an hermetically impervious metal layer, disposed on the graphite layer, forming a second electrode of and encasing the device, and said metal layer having a margin embracing the second terminal in an hermetically sealed joint.

3. An hermetically sealed electrical device comprising a first porous electrode of film forming metal having a terminal riser, a dielectric film intimately covering the surface of said electrode and a semiconductor layer overlying the dielectric layer, a graphite layer overlying the semiconductor layer, a seal cap comprising a glass body disposed on the semiconductor layer, said body having first and second terminals spaced from each other and joined to the body in glass-to-metal seals, said first terminal being connected to said riser in an hermetically sealed joint, said second terminal surrounding the glass body, and an hermetically impervious metal layer, disposed on the graphite layer, forming a second electrode of and encasing the device, and said metal layer having a margin embracing the second terminal in an hermetically sealed joint.

4. An hermetically sealed electrical device comprising a porous anode of tantalum having a terminal riser, a dielectric film intimately covering the surface of said anode and a semi-conductor layer overlying the dielectric layer, a graphite layer overlying the semiconductor layer, a seal cap comprising a glass body disposed on the semiconductor layer, said body having first and second terminals spaced from each other and joined to the body in glass-to-metal seals, said first terminal being connected to said riser in an hermetically sealed joint, said second terminal surrounding the glass body, and an hermetically impervious metal layer, disposed on the graphite layer, forming a cathode of and encasing the device, and said metal layer having a margin embracing the second terminal in an hermetically sealed joint.

5. An hermetically sealed electrical device comprising a porous anode of tantalum having a terminal riser, a dielectric film intimately covering the surface of said anode and a semiconductor layer overlying the dielectric layer, a graphite layer overlying the semiconductor layer, a seal cap comprising a glass body disposed on the semiconductor layer, said body having first and second terminals spaced from each other and joined to the body in glass-to-metal seals, said first terminal being connected to said riser in an hermetically sealed joint, said second terminal including a metallic ring surrounding the glass body, and an hermetically impervious metal layer, disposed on the graphite layer, forming a cathode of and encasing the device, and said metal layer having a margin embracing said metallic ring of the second terminal in an hermetically sealed joint.

6. An hermetically sealed electrical device comprising a porous anode of tantalum having a terminal riser, a dielectric film intimately covering the surface of said anode and a manganese dioxide layer overlying the dielectric layer, a graphite layer overlying the manganese dioxide layer, a seal cap comprising a glass body disposed on the manganese dioxide layer, said body having first and second terminals spaced from each other and joined to the body in glass-to-metal seals, said first terminal being connected to said riser in an hermetically sealed joint, said second terminal including a metallic ring surrounding the glass body, and an hermetically impervious metal layer, disposed on the graphite layer, forming a cathode of and encasing the device, and said metal layer having a margin embracing the outer periphery of said metallic ring of the second terminal in an hermetically sealed joint.

7. An hermetically sealed electrical device comprising a porous anode of tantalum having a terminal riser, a dielectric film intimately covering the surface of said anode and a manganese dioxide layer overlying the dielectric layer, a graphite layer overlying the manganese dioxide layer, a seal cap comprising a glass body disposed on the manganese dioxide layer, said body having first and second terminals spaced from each other and joined to the body in glass-to-metal seals, said first terminal being connected to said riser in an hermetically sealed joint, said second terminal including a metallic ring surrounding the glass body, and an hermetically impervious metal layer, disposed on the graphite layer, forming a cathode of and encasing the device, said metal layer selected from the group consisting of nickel and iron, and said metal layer having a margin embracing the outer periphery of said metallic ring of the second terminal in an hermetically sealed joint.

8. An hermetically sealed electrical device comprising a porous anode of tantalum having a terminal riser, a dielectric film intimately covering the surface of said anode and a manganese dioxide layer overlying the dielectric layer, a graphite layer overlying the manganese dioxide layer, a seal cap comprising a glass body disposed on the manganese dioxide layer, said body having first and second terminals spaced from each other and joined to the body in glass-to-metal seals, said first terminal being connected to said riser in an hermetically sealed joint, said second terminal including a metallic ring surrounding the glass body, and an hermetically impervious metal layer having a thickness of about 3 to 5 mils, disposed on the graphite layer, forming a cathode of and encasing the device, said metal layer selected from the group consisting of nickel and iron, and said metal layer having a margin embracing the outer periphery of said metallic ring of the second terminal in an hermetically sealed joint.

9. An hermetically sealed electrical device comprising a first porous electrode of film forming metal having a terminal riser, a dielectric film intimately covering the surface of said electrode and a semiconductor layer overlying the dielectric layer, a seal cap comprising a glass body disposed on the semiconductor layer, said body having first and second terminals spaced from each other and joined to the body in glass-to-metal seals, said first terminal being connected to said riser in an hermetically sealed joint, said second terminal including an integrally connected lead projecting therefrom in substantially parallel relationship with said first terminal, said second terminal surrounding the glass body, and an hermetically impervious metal layer, disposed on the semiconductive layer, forming a second electrode of and encasing the device, and said metal layer having a margin embracing the second terminal in an hermetically sealed joint.

10. An hermetically sealed electrical device comprising a porous anode of film forming metal having a terminal riser, a dielectric film intimately covering the surface of said anode and a maganese dioxide layer overlying the dielectric layer, a graphite layer overlying the manganese dioxide layer, a seal cap comprising a glass body disposed on the manganese dioxide layer, said body having first and second terminals spaced from each other and joined to the body in glass-to-metal seals, said first terminal being connected to said riser in an hermetically sealed joint, said second terminal including an integrally connected lead projecting therefrom in substantially parallel relationship with said first terminal, said second terminal further including a metallic ring surrounding the glass body, and an hermetically impervious metal layer having a thickness of about 3 to 5 mils, disposed on the graphite layer, forming a cathode of and encasing the device, said metal layer selected from the group consisting of nickel and iron, and said metal layer having a margin embracing the outer periphery of said metallic ring of the second terminal in an hermetically sealed joint.

11. An hermetically sealed electrical device comprising a rectangular-shaped porous anode of tantalum having a terminal riser, a dielectric film intimately covering the surface of said anode and a manganese dioxide layer overlying the dielectric layer, a graphite layer overlying the manganese dioxide layer, a seal cap comprising a glass body disposed on the manganese dioxide layer, said body having first and second terminals spaced from each other and joined to the body in glass-to-metal seals, said first terminal being connected to said riser in an hermetically sealed joint, said second terminal including an integrally connected lead projecting therefrom in substantially parallel relationship with said first terminal, said second terminal further including a metallic ring surrounding the glass body, and an hermetically impervious metal layer having a thickness of about 3 to 5 mils, disposed on the graphite layer, forming the cathode of and encasing the device, said metal layer selected from the group consisting of nickel and iron, and said metal layer having a margin embracing the outer periphery of the metallic ring of the second terminal in an hermetically sealed joint.

12. An hermetically sealed electrical device comprising a first porous electrode of film forming metal having an axial terminal riser, a dielectric film intimately covering the surface of said electrode and a semiconductor layer overlying the dielectric layer, a seal cap comprising a glass body disposed on the semiconductor layer, said body having first and second terminals spaced from each other and joined to the body in glass-to-metal seals, said first terminal being connected to said riser in an hermetically sealed joint, said second terminal surrounding the glass body, an axial cathode lead, and an hermetically impervious metal layer, disposed on the semiconductive layer, forming a second electrode of and encasing the device, and said metal layer having a margin embracing the second terminal and said axial cathode lead in hermetically sealed joints.

13. An hermetically sealed electrical device comprising a porous anode of film forming metal having a terminal riser, a dielectric film intimately covering the surface of said anode and a manganese dioxide layer overlying the dielectric layer, a graphite layer overlying the manganese dioxide layer, a seal cap comprising a glass body disposed on the manganese dioxide layer, said body having first and second terminals spaced from each other and joined to the body in glass-to-metal seals, said first terminal being connected to said riser in an hermetically sealed joint, said second terminal including a metallic ring surrounding the glass body, an axial cathode lead, and an hermetically impervious metal layer having a thickness of about 3 to 5 mils disposed on the graphite layer, forming the cathode of and encasing the device, said metal layer selected from the group consisting of nickel and iron, and said metal layer having a margin embracing the outer periphery of said metallic ring of the second terminal and said axial cathode lead in hermetically sealed joints.

14. An hermetically sealed electrical device comprising a cylindrical-shaped porous anode of tantalum having a terminal riser, a dielectric film intimately covering the surface of said anode and a manganese dioxide layer overlying the dielectric layer, a graphite layer overlying the manganese dioxide layer, a seal cap comprising a glass body disposed on the manganese dioxide layer, said body having first and second terminals spaced from each other and joined to the body in glass-to-metal seals, said first terminal being connected to said riser in an hermetically sealed joint, said second terminal including a metallic ring surrounding the glass body, an axial cathode lead, and an hermetically impervious metal layer having a thickness of about 3 to 5 mils disposed on the graphite layer, forming the cathode of and encasing the device, said metal layer selected from the group consisting of nickel and iron, and said metal layer having a margin embracing the outer periphery of the metallic ring the second terminal and said axial cathode lead in hermetically sealed joints.

References Cited by the Examiner

UNITED STATES PATENTS

| | | | |
|---|---|---|---|
| 3,036,249 | 5/1962 | Hall | 317—230 |
| 3,124,728 | 3/1964 | Ruben | 317—230 |
| 3,241,008 | 3/1966 | Komisarek | 317—230 |
| 3,248,618 | 4/1966 | Szpak et al. | 317—230 |

JAMES D. KALLAM, *Primary Examiner.*